(12) United States Patent
Hirooka

(10) Patent No.: US 6,912,845 B2
(45) Date of Patent: Jul. 5, 2005

(54) INTERNAL COMBUSTION ENGINE, CONTROL APPARATUS FOR INTERNAL COMBUSTION ENGINE, AND CONTROL METHOD FOR INTERNAL COMBUSTION ENGINE

(75) Inventor: Shigemasa Hirooka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/649,881

(22) Filed: Aug. 28, 2003

(65) Prior Publication Data

US 2004/0045286 A1 Mar. 11, 2004

(30) Foreign Application Priority Data

Sep. 6, 2002 (JP) ......................................... 2002-261082

(51) Int. Cl.⁷ ................................................. F01N 3/00
(52) U.S. Cl. .............................. 60/285; 60/274; 60/284; 60/289; 60/290; 60/293
(58) Field of Search .......................... 60/274, 284, 285, 60/289, 290, 292, 293, 304, 305

(56) References Cited

U.S. PATENT DOCUMENTS

| 5,235,956 | A | * | 8/1993 | Yoshizaki ................... 123/585 |
| 5,537,321 | A | * | 7/1996 | Yoshizaki et al. ............ 701/99 |
| 5,706,653 | A | * | 1/1998 | Shoji et al. ................... 60/276 |
| 6,050,086 | A | * | 4/2000 | Ishizuka et al. .............. 60/274 |

FOREIGN PATENT DOCUMENTS

JP  A 11-229861  8/1999

* cited by examiner

Primary Examiner—Binh Q. Tran
(74) Attorney, Agent, or Firm—Oliff & Berridge PLC

(57) ABSTRACT

An internal combustion engine includes an air pump that supplies secondary air to an upstream side of an exhaust gas control catalyst in an exhaust pipe via a secondary air supply passage; an adjusting device that adjusts an intake air amount delivered into a combustion chamber from an intake pipe; and a controller that performs control for increase correction of the intake air amount adjusted by the adjusting device when the air pump performs an operation of supplying the secondary air. Thus, it is possible to prevent a problem caused by a reduction in an engine speed due to the secondary air supply.

17 Claims, 6 Drawing Sheets

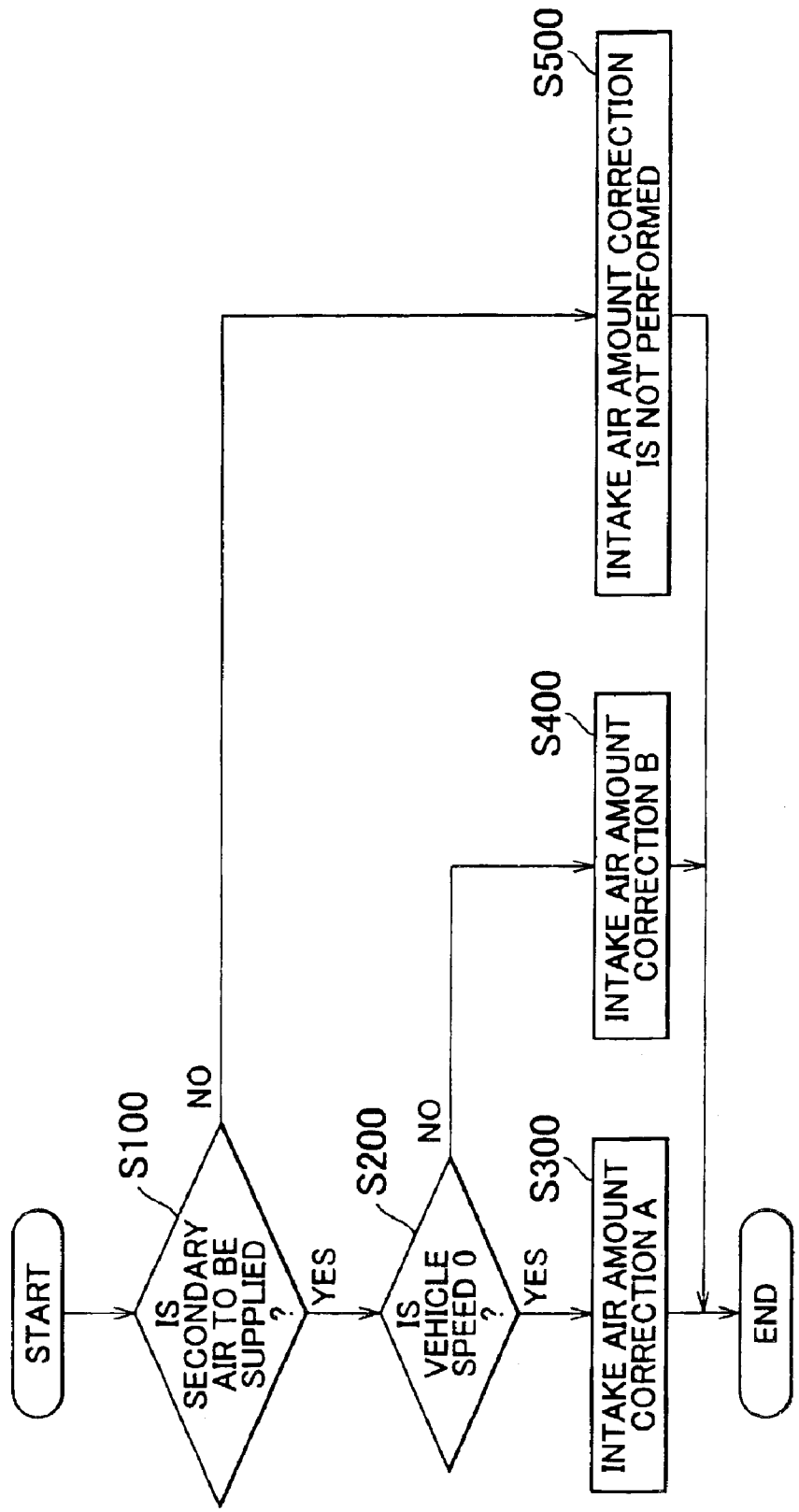

INTERNAL COMBUSTION ENGINE, CONTROL APPARATUS FOR INTERNAL COMBUSTION ENGINE, AND CONTROL METHOD FOR INTERNAL COMBUSTION ENGINE

INCORPORATION BY REFERENCE

The disclosure of Japanese Patent Application No. 2002-261082 filed on Sep. 6, 2002, including the specification, drawings and abstract is incorporated herein by reference in its entirety.

BACKGROUND OF THE INVENTION

1. Field of the Invention

The invention relates to an internal combustion engine including a secondary air supply mechanism, a control apparatus for the internal combustion engine, and a control method for the internal combustion engine.

2. Description of the Related Art

A conventional exhaust gas control structure is known, in which an exhaust gas control catalyst is provided in an exhaust pipe of an internal combustion engine. The exhaust gas control catalyst has a function of transforming air pollutants such as HC, CO, NOx, and the like that are contained in exhaust gas into harmless $H_2O$, $CO_2$, $N_2$, and the like.

However, the exhaust gas control catalyst needs to be placed in an environment at a given activation temperature (for example, 350° C. or higher) so as to fully perform the function. Therefore, when the engine is cold, for example when the engine is started, the exhaust gas control catalyst does not fully perform the function.

Thus, there is known an internal combustion engine including a secondary air supply mechanism for fully purifying the exhaust gas (for example, refer to Patent Document 1).

[Patent Document 1]
  Japanese Patent Laid-Open Publication No. 11-229861

The secondary air supply mechanism is a system which supplies secondary air to an upstream side of an exhaust gas control catalyst in an exhaust pipe via a secondary air supply passage by using an air pump.

The mechanism supplies secondary air into the exhaust pipe so as to increase a concentration of oxygen in the exhaust pipe, thereby oxidizing HC and CO contained in the exhaust gas so as to purify the exhaust gas. Also, by oxidizing HC and CO, the temperature of the exhaust gas can be increased. Therefore, there is also an effect of reducing the time required for an environmental temperature for the aforementioned exhaust gas control catalyst to reach the activation temperature.

When the secondary air is supplied, since the air pump is operated, electric load increases. Therefore, load for electric power generation performed by an alternator increases, and a load on the engine increases. As a result, the engine speed decreases.

When the engine speed thus decreases, idling stability deteriorates during idling immediately after the engine is started when the engine is cold. Also, there is a possibility that the engine stall occurs due to the deterioration of the idling stability.

Also, the exhaust gas amount decreases due to the decrease in the engine speed. Accordingly, there are problems that the effect of the secondary air supply decreases, warm-up efficiency of the catalyst decreases, and the exhaust gas characteristics deteriorate.

SUMMARY OF THE INVENTION

In view of the above problems, the invention provides an internal combustion engine, a control apparatus for an internal combustion engine, and a control method for an internal combustion engine which prevent problems due to a reduction in an engine speed when secondary air is supplied.

According to an exemplary embodiment of the invention, there is provided an internal combustion engine which includes an air pump that supplies secondary air to an upstream side of an exhaust gas control catalyst in an exhaust pipe via a secondary air supply passage; an adjusting device that adjusts an intake air amount delivered into a combustion chamber from an intake pipe; and a controller that performs control for increase correction of the intake air amount adjusted by the adjusting device when the air pump performs an operation of supplying the secondary air.

According to another aspect of the invention, there is provided a control method for an internal combustion engine which includes an air pump that supplies secondary air to an upstream side of an exhaust gas control catalyst in an exhaust pipe via a secondary air supply passage; and an adjusting device that adjusts an intake air amount delivered into a combustion chamber from an intake pipe. The control method includes the step of performing increase correction of the intake air amount adjusted by the adjusting device when the air pump performs an operation of supplying the secondary air.

Hereinafter, the secondary air signifies air which is supplied to exhaust gas that has been generated in the combustion chamber of the internal combustion engine in a combustion stroke.

Examples of the adjusting device include idle speed control (ISC) and an electronic control throttle system.

According to the internal combustion engine thus configured, and the control method for an internal combustion engine, air is delivered into the combustion chamber such that the intake air amount is increased by increase correction when the operation of supplying the secondary air is performed during idling immediately after the engine is started or after completion of idling. Accordingly, the internal combustion engine according to the invention performs a function of suppressing or preventing a reduction of an engine speed due to the operation of supplying the secondary air. Thus, it is possible to maintain idling stability, and suppress a reduction in the engine speed. Also, since a reduction in the exhaust gas amount can be suppressed or prevented, warm-up efficiency of the catalyst is improved.

According to another aspect of the invention, there is provided an internal combustion engine for a vehicle, which includes an air pump that supplies secondary air to an upstream side of an exhaust gas control catalyst in an exhaust pipe via a secondary air supply passage; an adjusting device that adjusts an intake air amount delivered into a combustion chamber from an intake pipe; a vehicle speed detector which detects a vehicle speed; and a controller that performs control for increase correction of the intake air amount adjusted by the adjusting device when the air pump performs an operation of supplying the secondary air, and that derives an increase correction amount for the increase correction in a case where the vehicle speed detected by the vehicle speed detector is 0 using a first process, and derives an increase correction amount for the increase correction in a case where the vehicle speed detected by the vehicle speed detector is not 0 using a second process that is different from the first process.

Examples of the process include a process in which data is input (substituted) into an operational equation so as to derive (i.e., calculate) an increase correction value, and a process in which an increase correction value is derived (selected) using a table.

According to the internal combustion engine for a vehicle thus configured, air is delivered into the combustion chamber such that the intake air amount is increased by increase correction when the operation of supplying the secondary air is performed. Accordingly, the internal combustion engine for a vehicle according to the invention performs a function of suppressing or preventing a reduction of an engine speed due to the operation of supplying the secondary air. Thus, it is possible to maintain idling stability and to improve warm-up efficiency of the catalyst.

Also, since the increase correction amount in the case where the vehicle speed is 0 and the increase correction amount in the case where the vehicle speed is not 0 are derived using different processes, appropriate increase correction can be performed such that a required intake air amount can be obtained in each of the cases. Accordingly, the internal combustion engine for a vehicle according to the invention performs a function of suppressing or preventing a reduction of an engine speed due to the operation of supplying the secondary air, more appropriately.

According to a further aspect of the invention, there is provided a control apparatus for an internal combustion engine for a vehicle, which includes an adjusting device that adjusts an intake air amount delivered into a combustion chamber from an intake pipe; a recognizing device that recognizes whether or not secondary air is to be supplied; a vehicle speed detector that detects a vehicle speed; and a controller that derives an increase correction amount for increasing the intake air amount delivered into the combustion chamber from the intake pipe using a first process when the recognizing device recognizes that the secondary air is to be supplied and the vehicle speed detector detects that the vehicle speed is 0, and derives an increase correction amount for increasing the intake air amount using a second process which is different from the first process when the recognizing device recognizes that the secondary air is to be supplied and the vehicle speed detector detects that the vehicle speed is not 0, and that gives instruction to the adjusting device such that the intake air amount is increased by the derived increase correction amount.

According to the control apparatus for an internal combustion engine for a vehicle thus configured, when the secondary air is supplied, control for the internal combustion engine is performed for delivering air into the combustion chamber such that the intake air amount is increased by the increase correction amount. The increase correction amount is derived using the process corresponding to each of the case where the vehicle speed is 0 and the case where the vehicle speed is not 0. Accordingly, it is possible to perform appropriate control such that the internal combustion engine performs the function of suppressing or preventing a reduction in the engine speed due to the operation of supplying the secondary air.

According to a further aspect of the invention, there is provided a control method for an internal combustion engine for a vehicle which includes the following steps of deriving an increase correction amount for increasing an intake air amount in a case where a vehicle speed is 0 using a first process, and deriving an increase correction amount for increasing the intake air amount in a case where the vehicle speed is not 0 using a second process that is different from the first process when secondary air is supplied; and performing control so as to deliver air into a combustion chamber such that the intake air amount is increased by the derived increase correction amount.

According to the control method for an internal combustion engine for a vehicle, when the internal combustion engine performs the operation of supplying secondary air, air is delivered into the combustion chamber such that the intake air amount is increased by the increase correction amount. The increase correction amount is derived using the process corresponding to each of the case where the vehicle speed is 0 and the case where the vehicle speed is not 0. Accordingly, the internal combustion engine performs the function of appropriately suppressing or preventing a reduction in the engine speed due to the operation of supplying the secondary air.

BRIEF DESCRIPTION OF THE DRAWINGS

The above mentioned and other objects, features, advantages, technical and industrial significances of this invention will be better understood by reading the following detailed description of preferred embodiments of the invention, when considered in connection with the accompanying drawings, in which:

FIG. 3 is a flowchart of a control process for the internal combustion engine according to the embodiment of the invention;

DETAILED DESCRIPTION OF THE PREFERRED EMBODIMENTS

In the following description and the accompanying drawings, the present invention will be described in more detail with reference to exemplary embodiments.

[First Embodiment]

An internal combustion engine, a control apparatus for an internal combustion engine, and a control method for an internal combustion engine according to a first embodiment will be described with reference to FIG. 1 to FIG. 4. In the embodiment, a configuration will be described in which idle speed control (ISC) is employed as an adjusting device which adjusts an intake air amount delivered to a combustion chamber from an intake pipe.

Figure 1:
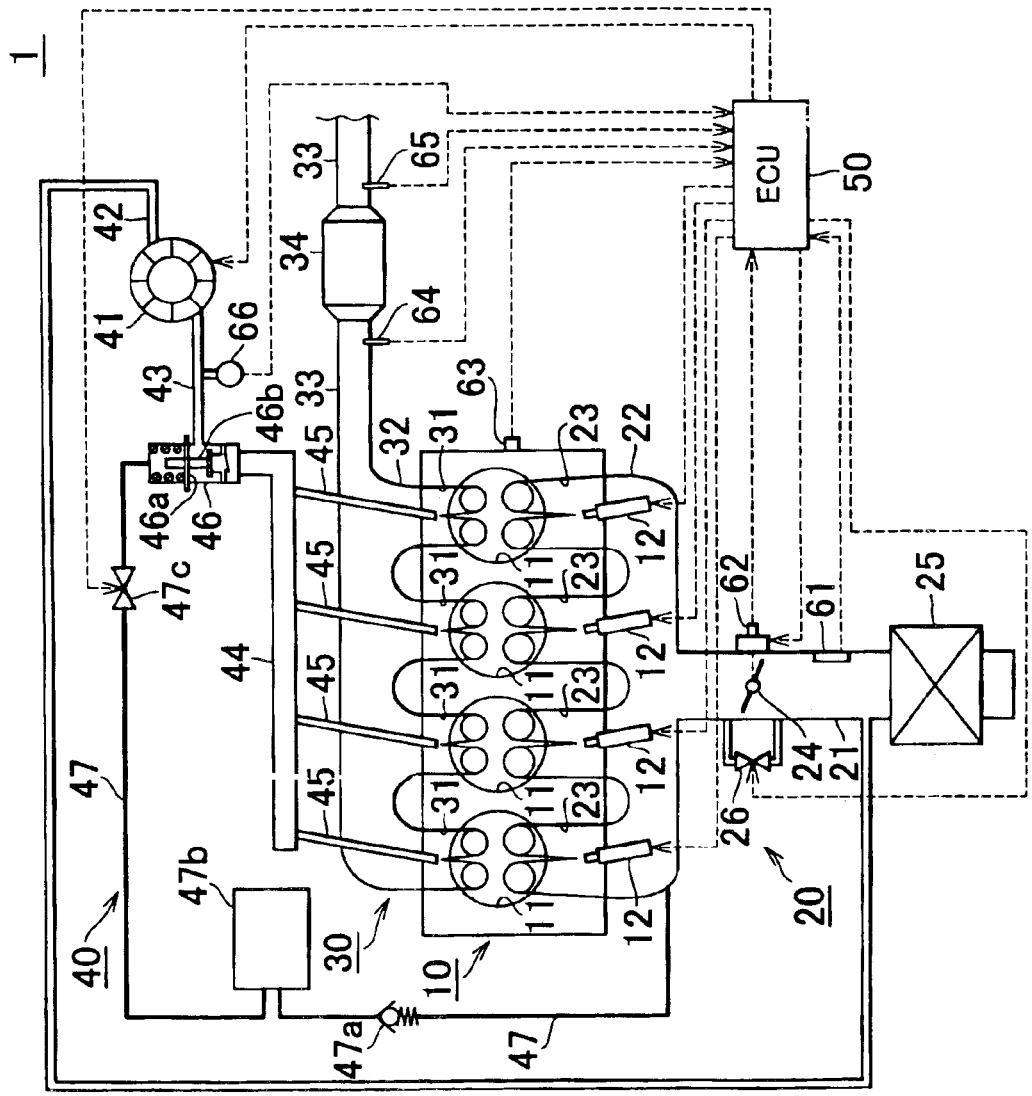
FIG. 1 is a block diagram showing a basic configuration of an internal combustion engine according to a first embodiment of the invention.
Figure 4:
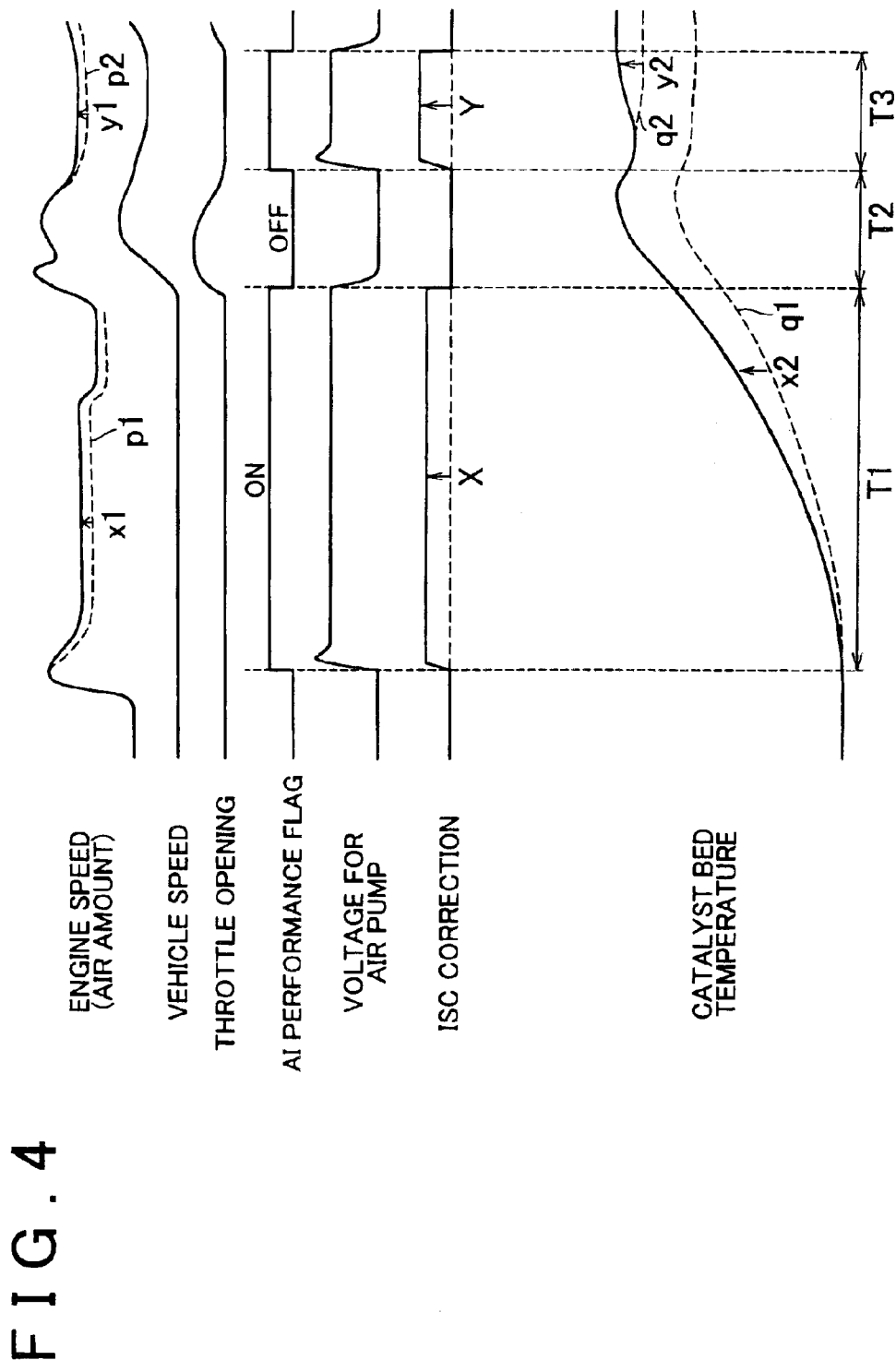
FIG. 4 is a timing chart showing a time-dependent variation in a state change amount or the like at each of portions concerning the internal combustion engine according to the embodiment of the invention.

FIG. 1 is a block diagram showing a basic configuration of an internal combustion engine according to a first embodiment of the invention. FIG. 2 is a diagram describing an operation of a secondary air supply control valve. FIG. 3 is a flowchart of a control process for the internal combustion engine according to the embodiment of the invention. FIG. 4 is a timing chart showing a time-dependent variation in a state change amount or the like at each of portions concerning the internal combustion engine according to the embodiment of the invention.

[Basic Configuration of Internal Combustion Engine]

As shown in FIG. 1, a gasoline engine system (hereinafter referred to as an engine) 1 as an internal combustion engine includes an engine main body 10 in which in-line four combustion chambers (cylinders) 11 are formed, an intake system 20 for delivering air into each of the combustion chambers 11, an exhaust system 30 for discharging exhaust gas in each of the combustion chambers 11 after combustion, a secondary air supply system 40 for supplying secondary air, and an electronic control unit (hereinafter, referred to as an ECU) 50 as control means for controlling components of the internal combustion engine.

The engine main body 10 includes a cylinder block and a cylinder head that are outer members, and in-line four combustion chambers 11 therein. Intake ports 23 for introducing an air-fuel mixture into the combustion chambers 11 and exhaust ports 31 for discharging exhaust gas from the combustion chambers 11 are formed in the cylinder head. Each of the intake ports 23 corresponding to each of the combustion chambers 11 is provided with a fuel injection valve 12. The fuel injection valve 12 is an electromagnetic valve including an electromagnetic solenoid (not shown) therein. The fuel injection valve 12 is appropriately opened according to a command signal from the ECU 50 so as to inject fuel into the combustion chamber 11.

The intake system 20 forms a passage (an intake passage) for introducing intake air into each of the combustion chambers 11. More specifically, the intake system 20 includes an intake pipe 21, an intake manifold 22, and intake ports 23 from an upstream side in an air flow passage. The intake pipe 21 and the intake manifold 22 are connected, and the intake manifold 22 and the intake ports 23 are connected, whereby the intake passage is formed.

An air cleaner 25 having a filter for removing dust or the like contained in the intake air is provided upstream in the intake pipe 21.

A throttle valve 24 which moves according to a depression amount of an accelerator pedal (not shown) is provided on the downstream side of the air cleaner 25 in the intake pipe 21. An idle speed control valve (hereinafter, referred to as ISCV) 26 is provided in a bypass passage which directly connects the upstream side and the downstream side of the throttle valve 24.

The ISCV 26 adjusts an intake air amount by adjusting an air flow area in the bypass passage. The ISCV 26 is used for delivering air into the combustion chambers 11 while the throttle valve 24 is closed. Accordingly, the ISCV 26 is normally used only during idling. However, in the embodiment, the ISCV 26 may be used at times other than during idling. In this regard, description will be made in detail later.

As described above, in the embodiment, the system is employed in which the throttle valve 24 and the ISCV 26 adjust the intake air amount delivered into the combustion chambers 11 from the intake pipe 21.

The exhaust system 30 forms a passage (an exhaust passage) for discharging exhaust gas from the combustion chambers 11. More specifically, the exhaust system 30 includes exhaust ports 31, an exhaust manifold 32, and an exhaust pipe 33 from the upstream in an exhaust gas flow passage. The exhaust ports 31 and the exhaust manifold 32 are connected, and the exhaust manifold 32 and the exhaust pipe 33 are connected, whereby the exhaust passage is formed.

A catalyst casing 34 is provided in the exhaust pipe 33. In the catalyst casing 34, there is installed an exhaust gas control catalyst (for example, a three way catalyst) having a function of oxidizing HC, CO, and NOx contained in the exhaust gas so as to purify the exhaust gas.

A secondary air supply system 40 has a function of supplying each of the exhaust ports with air introduced from the outside of the engine 1 as secondary air. An electric air pump (hereinafter, referred to as an air pump) 41 is operated according to a command signal from the ECU 50, sucks air at a portion in the intake pipe 21 (a portion upstream of the throttle valve 24 and downstream of the air cleaner 25) via an introduction passage 42, and pressure-feeds air to a main supply pipe 44 via a pressure-feed pipe 43.

The air that has been pressure-fed to the main supply pipe 44 is supplied to each of the exhaust ports 31 via four distributing pipes 45. In the embodiment, a delivery amount of the secondary air is constant.

A secondary air control valve 46 which opens/closes a passage for air flowing between the pressure-feed passage 43 and the main supply pipe 44 is provided at a portion at which the pressure-feed pipe 43 and the main supply pipe 44 are connected.

A diaphragm 46a and a valve element 46b which is operated by deformation of the diaphragm 46a are provided inside the secondary air control valve 46. The valve element 46b opens the passage for air flowing between the delivery passage 43 and the main supply pipe 44 only when the diaphragm 46a is deformed.

A vacuum pressure passage 47 for applying a vacuum pressure (a sucking force) generated in the intake system 20 to the diaphragm 46a is connected to the secondary air control valve 46. The vacuum pressure passage 47 connects the intake manifold 22 and the secondary air control valve 46. In the vacuum pressure passage 47, a check valve 47a, a vacuum pressure tank 47b, and a vacuum pressure control valve 47c are provided from the intake manifold 22 side toward the secondary air control valve 46 side. The check valve 47a permits air to flow only toward the intake manifold 22, and interrupts air flow from the intake manifold 22 toward the vacuum pressure tank 47b. The vacuum pressure tank 47b is a pressure-resistant container in which a gas pressure can be maintained at a level lower than an atmospheric pressure. The vacuum pressure control valve 47c is an opening/closing valve which is electromagnetically driven. The vacuum pressure control valve 47c is normally closed, but is appropriately opened according to a command signal from the ECU 50.

While the engine 1 is operated, a vacuum pressure is generated in the intake manifold 22. Therefore, a pressure in the vacuum pressure tank 47b decreases to be lower than the atmospheric pressure (the pressure in the vacuum pressure tank 47b is maintained at a vacuum pressure). When the ECU 50 opens the vacuum pressure control valve 47c under these conditions, the vacuum pressure (a sucking force) in the vacuum pressure tank 47b deforms the diaphragm 46a in the secondary air control valve 46. Owing to the deformation of the diaphragm 46a, the valve element 46b is operated, which opens the passage for air flowing between the pressure-feed passage 43 and the main supply pipe 44. When the air pump 41 is operated at this time, the air (the secondary air) introduced from the outside of the engine 1 is pressure-fed to the main supply pipe 44 from the air pump 41, and is supplied to the exhaust ports 31 via the distributing pipes 45.

Also, various sensors 61 to 66 are provided at portions concerning the engine 1. The various sensors 61 to 66 output signals indicative of the environmental condition at each of the portions and the operating state of the engine 1.

For example, an airflow meter 61 provided in the intake pipe outputs a detecting signal according to a flow amount of the intake air (an intake air amount). A throttle opening sensor 62 is attached to the throttle valve 24, and outputs a detecting signal according to the opening of the throttle valve 24. A crank angle sensor 63 outputs a detecting signal (a pulse) each time an output shaft (a crankshaft) of the engine 1 rotates by a predetermined angle. Each of oxygen concentration sensors 64, 65 that are provided upstream and downstream of the catalyst casing 34 in the exhaust pipe 33 outputs a detecting signal which continuously changes according to the concentration of oxygen in the exhaust gas at a portion where each of the oxygen concentration sensors 64, 65 is provided. The detecting signal from each of the oxygen concentration sensors 64, 65 reflects an air-fuel ratio of an air-fuel mixture used for combustion in the engine, and is an index directly indicating the amount of oxidizing components ($O_2$ and the like) and reducing components (HC and the like) in the exhaust gas. Also, a pressure sensor 66 outputs a detecting signal according to a pressure P in the pressure-feed passage 43 in the secondary air supply system 40. These various sensors 61 to 66 are electrically connected to the ECU 50.

The ECU 50 includes a central processing unit (CPU), a read-only memory (ROM), a random access memory (RAM), a backup RAM, a timer counter, and the like. Further, the ECU 50 includes an external input circuit including an A/D converter, an external output circuit, and the like. The CPU, ROM, RAM, the backup RAM, the timer counter and the like, and the external input circuit and the external output circuit and the like are connected by a bi-directional bus, whereby a logic operation circuit is constituted as a whole.

The ECU 50 thus configured performs various types of control concerning the operating state of the engine 1, based on the detecting signals from the various sensors 61 to 66. The various types of control includes control (fuel injection control) for injecting fuel to each of the intake ports 23 by opening/closing each of the fuel injection valves 12, and control (secondary air supply control) for supplying secondary air to each of the exhaust ports 31 by opening/closing each of the vacuum pressure control valves 47c and by driving the air pump 41.

[Secondary Air Supply Control]

Next, the secondary air supply control will be described in detail. The engine 1 increases the amount of fuel supplied to the combustion chambers 11 via the fuel injection valves 12 when the engine is operated under the condition that the temperature of the engine main body 10 has not become sufficiently high (i.e., the engine is cold), for example, at the time of engine start. In other words, the air-fuel mixture used for combustion in the engine is made rich so as to stabilize the combustion in the engine and to promote warm-up.

However, when the air-fuel mixture used for combustion in the engine is made rich, unburned fuel (fuel including HC, CO, and the like) in the exhaust gas increases. In addition, under the condition that fuel is required to increase in this manner, the temperature of the exhaust gas control catalyst provided in the exhaust system 30 is low, and normally has not reached a temperature at which the catalyst is sufficiently activated (an activation temperature).

Therefore, in the engine 1, when the air-fuel mixture used for combustion in the engine is made rich under the condition that the temperature of the exhaust gas control catalyst has not reached the activation temperature, for example, when the engine is started while being cold, the secondary air supply control is performed. Owing to the secondary air supply control, air is mixed into the exhaust gas immediately after the exhaust gas is discharged from each of the combustion chambers 11, whereby the oxidization reaction of the unburned fuel components (HC, CO) contained in the exhaust gas is promoted. Accordingly, purification of the unburned fuel components can be promoted upstream of the exhaust gas control catalyst. In addition, the activation of the exhaust gas control catalyst can be accelerated using the heat of the reaction.

Figure 2A:
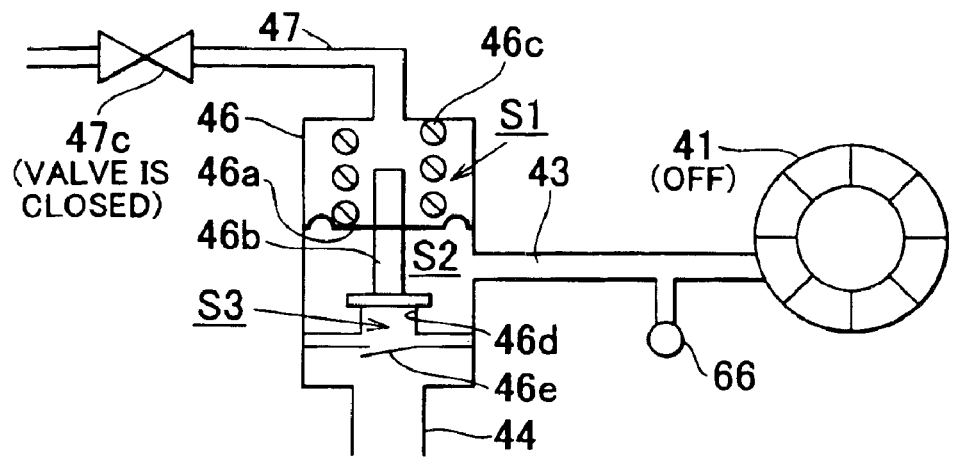
FIG. 2A, FIG. 2B, and FIG. 2C are diagrams describing an operation of a secondary air control valve.
Figure 2B:
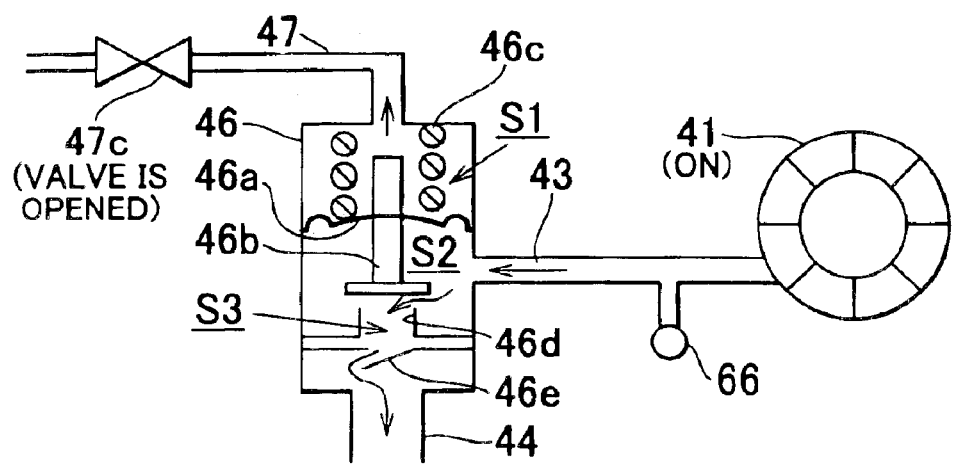
Figure 2C:
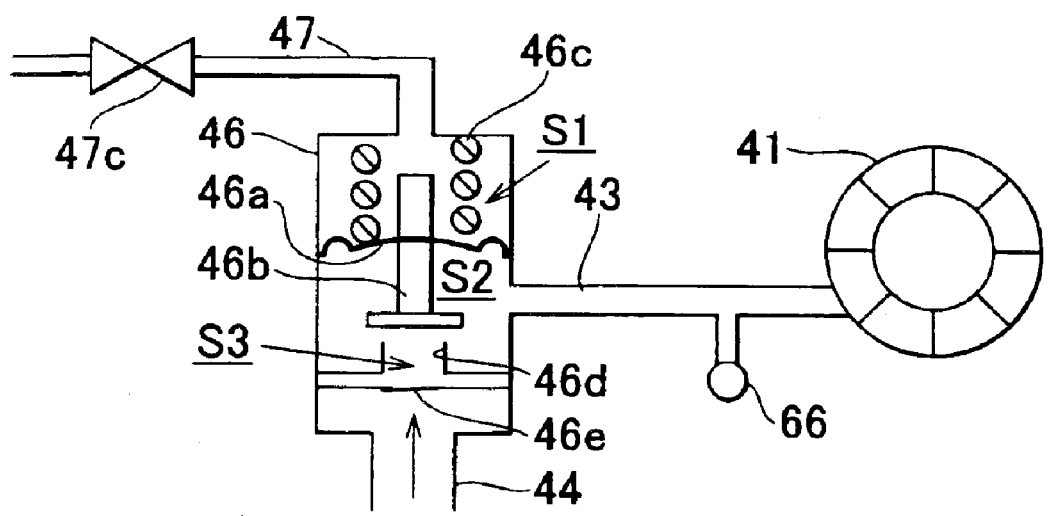

FIG. 2A, FIG. 2B, and FIG. 2C are diagrams schematically describing functions of the secondary air control valve 46, the vacuum pressure control valve 47c, and the air pump 41 that constitute the secondary air supply system 40.

The inside of the secondary air control valve 46 is divided into three spaces, that is, a first space S1, a second space S2, and a third space S3. Mutual communication is provided between the first space S1 and the vacuum pressure passage 47, between the second space S2 and the pressure-feed passage 43, and between the third space S3 and the main supply pipe 44. The diaphragm 46a serves as a partition between the first space S1 and the second space S2 is integrally formed with the valve element 46b. Also, a communication hole 46d which provides mutual communication between the spaces S2, S3 is disposed on a boundary between the second space S2 and the third space S3. A spring 46c housed on the first space S1 side urges the diaphragm 46a toward the second space S2 side such that the valve element 46b blocks the communication hole 46d.

Thus, as shown in FIG. 2A, when the vacuum pressure control valve 47c is closed, mutual communication between the second space S2 (the pressure-feed passage 43) and the third space S3 (the main supply pipe 44) is interrupted by the valve element 46b.

Meanwhile, as shown in FIG. 2B, when the vacuum pressure control valve 47c is opened, the pressure in the first space S1 becomes a vacuum pressure (i.e., the pressure becomes lower than the atmospheric pressure), whereby the force for sucking the diaphragm 46a toward the first space S1 side is generated. The force for sucking the diaphragm 46a toward the first space S1 side becomes larger than the urging force of the spring 46c, whereby the valve element 46b moves away from the end surface of the opening of the communication hole 46d. As a result, mutual communication is provided between the second space S2 (the pressure-feed passage 43) and the third space S3 (the main supply pipe 44).

When the secondary air supply control is performed, the vacuum pressure control valve 47c is opened and the air pump 41 is operated at the same time according to the command signal from the ECU 50. As a result, the air that has been pressure-fed from the air pump 41 is delivered to the main supply pipe 44 from the pressure-feed passage 43, and further, is supplied to each of the exhaust ports 31 via each of the distributing pipes 45.

A lead valve 46e provided in the third space S3 permits air to flow from the second space S2 to the main supply pipe 44 through the third space S3. Meanwhile, the lead valve 46e interrupts air flow from the main supply pipe 44 toward the second space S2 through the third space S3. If the valve element 46b is fixed so as to be away from the communication hole 46d for some reason, the lead valve 46e prevents the exhaust gas from flowing back from the main supply pipe 44 to the pressure-feed passage 43 (FIG. 2C).

[Control for Increase Correction of the Intake Air Amount]

Particularly, the increase correction of the intake air amount will be described with reference to FIG. 3 and FIG. 4. FIG. 4 shows, on the same time base, time-dependent variations in an engine speed, a vehicle speed, a throttle valve opening, an ON/OFF state of an AI (secondary air injection) performance flag, a voltage for an air pump, an ISC correction amount (an increase correction value for an intake air amount), and a catalyst bed temperature. Since the intake air amount is proportional to the engine speed, the intake air amount varies in the same manner as the engine speed.

In FIG. 4, a horizontal axis indicates elapse of time, and a vertical axis indicates the ON/OFF state of the AI performance flag, or a physical amount of each of the factors. Since it is sufficient to indicate interrelations among the time-dependent variations in the state change amounts at the portions, units or values are omitted on the vertical axis.

In FIG. 4, a period in which the AI performance flag is ON indicates a period in which instruction for performing secondary air injection (AI) is issued, and a period in which the AI performance flag is OFF indicates a period in which instruction for performing secondary air injection (AI) is not issued. Accordingly, the period in which the AI performance flag is ON substantially matches the period in which the secondary air is supplied, and the period in which the AI performance flag is OFF substantially matches the period in which the secondary air is not supplied.

The secondary air is supplied when a predetermined condition is satisfied. The condition for supplying secondary air is determined mainly using an environmental condition or a condition that a load on the engine is in a given range.

More specifically, the condition is determined using at least one of the following elements: (1) a condition that a coolant temperature is in a given range (normally −15° C. to 30° C.), (2) an intake air temperature (normally −15° C. to 30° C. (3) an elapsed time after engine start (for example, two seconds after engine start), (4) a battery voltage, (5) a load condition, (6) an elapsed time after AI is started, (7) accumulated air amount, and (8) a condition that an AI system is normal. Normally, the condition is determined using these plural elements from a comprehensive standpoint.

The timing chart shown in FIG. 4 indicates a variation in the state at each of the portions concerning the engine in a case where the vehicle is accelerated when the engine has not been sufficiently warmed-up immediately after the engine is started, the load on the engine exceeds a given amount so that the AI performance flag becomes OFF, and then, the vehicle is decelerated when the engine still has not been sufficiently warmed-up so that the AI performance flag becomes ON again.

When the engine is started while being cold, a condition for performing AI (hereinafter, referred to as an AI performance condition) is normally satisfied. Therefore, the AI performance flag becomes ON, and the secondary air is supplied. Accordingly, a voltage for the air pump is required in order to operate the air pump 41. While the accelerator pedal is not depressed and the throttle valve 24 is closed (i.e., during a period T1 in FIG. 4), the secondary air is supplied. The period T1 is so-called a first idling period.

When the accelerator pedal is depressed such that the throttle valve 24 is opened, and the vehicle starts to run before the engine is sufficiently warmed-up, the load on the engine becomes equal to or larger than a given value. Accordingly, the AI performance condition is not satisfied, the AI performance flag becomes OFF, and the secondary air is not supplied. Further, while the vehicle speed is maintained at a given value or higher, and the load on the engine is equal to or larger than a given value (during a period T2 in FIG. 4), the secondary air is not supplied.

Subsequently, when the accelerator pedal is released so as to close the throttle valve 24 before the engine is sufficiently warmed-up, and the vehicle speed becomes equal to or lower than the given value, the load on the engine becomes equal to or smaller than the given value, and the AI performance condition is satisfied again. Then, the AI performance flag becomes ON, and the secondary air supply is restarted (during a period T3 in FIG. 4). When the secondary air supply is restarted, the voltage for the air pump becomes necessary again.

The voltage for the air pump, which is necessary while the operation for supplying the secondary air is performed, is obtained from an alternator (not shown). The alternator performs a function of generating electric power using power supplied by the engine. Accordingly, since the load for electric power generation performed by the alternator increases due to the operation of the air pump, the load on the engine increases. As a result, the engine speed decreases. In FIG. 4, dotted lines p1, p2 indicate a variation in the engine speed in the case where no control is performed when the load on the engine increases due to the operation of the air pump.

Also, when the engine speed is low, the exhaust gas amount is small. Therefore, the effect of the secondary air supply is small, and the warm-up efficiency of the catalyst is low. Accordingly, an increasing rate of the catalyst bed temperature is low. In FIG. 4, a dotted line q1 indicates a variation in the catalyst bed temperature in the case where no control is performed when the load on the engine increases due to the operation of the air pump.

When the engine speed decreases as described above, the idling stability deteriorates. Also, when the increasing rate of the catalyst bed temperature is low, much time is required for increasing the catalyst temperature to the activation temperature. As a result, the exhaust gas characteristics deteriorate.

Accordingly, in the internal combustion engine according to the embodiment, when the load on the engine increases due to the operation of the air pump, and the engine speed decreases, increase correction is performed for increasing the intake air amount delivered into the combustion chambers from the intake pipe so as to suppress or prevent a reduction in the engine speed.

FIG. 3 is a flowchart showing a processing routine for performing increase correction of the intake air amount. This routine is appropriately performed by the ECU 50 in a repeated manner. For example, the routine may be periodically performed in a repeated manner, or may be performed in a repeated manner only during a given period.

The ECU 50 has at least a function of recognizing whether or not the secondary air is to be supplied, a function of detecting the vehicle speed, a function of deriving an increase correction amount for increasing the intake air amount, and a function of issuing instruction for controlling an idle speed such that the intake air amount is increased by the derived increase correction amount. It is sufficient if the function of detecting the vehicle speed can detect whether or not the vehicle speed is 0, as far as the routine is concerned.

When the routine processing is started, the ECU 50 detects whether or not the secondary air is to be supplied (step S100). More specifically, when it is determined whether or not the AI performance condition is satisfied, and it is determined that the condition is satisfied, it can be determined that the secondary air is to be supplied. Also, it may be detected whether or not the AI performance flag is ON or OFF. In this case, if the AI performance flag is ON, it can be determined that the secondary air is to be supplied.

When it is recognized that the secondary air is not to be supplied in step S100, the correction of the intake air amount is not performed (step S500), and the routine processing ends.

Meanwhile, when it is recognized that the secondary air is to be supplied in step S100, the increase correction of the intake air amount is performed.

Normally, the appropriate increase correction amount for increasing the intake air amount in the case where the vehicle speed is 0 (mainly during idling (during the period T1 in FIG. 4)) is different from the appropriate increase correction amount in the case where the vehicle speed is not 0 (normally, during deceleration (during the period T3 in FIG. 4)).

Accordingly, in the embodiment of the invention, when deriving the increase correction amount for increasing the intake air amount, the increase correction amount in the case where the vehicle speed is 0 and the increase correction amount in the case where the vehicle speed is not 0 are derived using different processes.

Therefore, when it is recognized that the secondary air is to be supplied in step S100, it is detected whether or not the vehicle speed is 0 (step S200). When the vehicle speed is 0, the processing of the intake air amount correction A is performed (step S300), and the routine processing ends. Meanwhile, when the vehicle speed is not 0, the processing of the intake air amount correction B is performed (step S400), and the routine processing ends.

The intake air amount correction A (hereinafter, simply referred to as correction A) and the intake air amount correction B (hereinafter, simply referred to as correction B) will be described in further detail.

When performing the increase correction of the intake air amount, the increase correction amount needs to be decided. Since the appropriate increase correction amount varies depending on the environment or the like, it is necessary to derive the appropriate increase correction amount according to the environment or the like. Accordingly, in the embodiment, a process is used in which the increase correction amount is derived by inputting a detected value concerning the environment or the like (i.e., input data).

Specific examples of the process include a process using an operational equation and a process using a table. In the case of the process using an operational equation, a predetermined operational equation is stored in advance in a storing device included in the ECU 50, and detected data concerning the environment or the like is substituted into the operational equation, whereby the increase correction amount for increasing the intake air amount can be calculated. In the case of the process using a table, a predetermined table is stored in advance in the storing device included in the ECU 50, and the increase correction amount for increasing the intake air amount can be selected so as to be derived using the table based on the detected data concerning the environment or the like.

Since the appropriate increase correction amount in the case of the correction A is different from the appropriate increase correction amount in the case of the correction B, the process of deriving the increase correction amount in the case of the correction A is different from the process of deriving the increase correction amount in the case of the correction B. Hereinafter, for the sake of convenience, the process of deriving the increase correction amount in the case of the correction A will be referred to as a first process, and the process of deriving the increase correction amount in the case of the correction B will be referred to as a second process. Thus, the first process and the second process are different. Therefore, in the aforementioned examples of the process, the operational equations or the tables to be used in the first process and the second process are different.

Accordingly, it is necessary to store, in the storing device included in the ECU 50, the operational equation or the table to be used in the first process and the operational equation or the table to be used in the second process, and to select the operational equation or the table to be used according to whether the correction A or B is to be performed.

Under the same condition, the required intake air amount in the case where the vehicle speed is not 0 is larger than that in the case where the vehicle speed is 0. Therefore, the operational equations or the tables for the first process and the second process are set such that the increase correction amount derived using the second process becomes larger than the increase correction amount derived using the first process when the increase correction amounts are derived using the processes based on the same data.

Subsequently, data to be input in the processes of deriving the increase correction amount will be described. Among input data that will be described below, some data can be suitably used in both of the first process and the second process, and some data can be suitably used only in one of the processes and cannot be suitably used in the other. In other words, data that becomes unstable in each of the processes (detected data that significantly changes) should not be used as input data.

The increase correction amount needs to be derived according to the environment or the like such that the amount becomes appropriate. More specifically, the increase correction amount needs to be appropriate according to the detected data concerning the coolant temperature, the intake air amount, a difference between a target engine speed and the engine speed that is actually measured, and the like.

Accordingly, it is necessary to provide a process of deriving the required increase correction amount using the detected data. It is considered that more appropriate increase correction amount can be derived if the amount is derived based on plural detected data from a comprehensive standpoint. However, it is also considered that no problem occurs even if the increase correction amount is derived based on one detected data by the process.

A case where each of the aforementioned detected data is used as input data will be briefly described.

As the coolant temperature increases, the required increase correction amount decreases. Accordingly, in the case where the increase correction amount is derived using the coolant temperature as input data, the process needs to be provided such that as the coolant temperature increases, the derived increase correction amount decreases.

Also, as the intake air amount that is actually measured increases, the required increase correction amount decreases. Accordingly, in the case where the increase correction amount is derived using the intake air amount as input data, the process needs to be provided such that as the intake air amount that is actually measured increases, the derived increase correction amount decreases.

Also, as the difference between the target engine speed and the engine speed that is actually measured increases, the required increase correction amount increases. Accordingly, in the case where the increase correction amount is derived using this difference as input data, the process needs to be provided such that as this difference increases, the derived increase correction amount increases.

The input data needs to be read at least before the operation of deriving the increase correction amount is started (in step S300, step S400 in FIG. 3). For example, the input data is read before it is recognized whether or not the secondary air is to be supplied (in step S100 in FIG. 3).

When a target increase correction amount is derived, and control is performed such that the intake air amount is increased by the derived increase correction amount, there is a possibility that the engine speed sharply increases, and the engine is adversely affected.

Thus, it is preferable that the actual increase correction amount for increasing the intake air amount should be increased in a stepwise manner so as to gradually become equal to the target increase correction amount. Naturally, it is preferable that the actual increase correction amount should gradually become equal to the target increase correction amount in this manner in both the cases of the first process and the second process.

More specifically, when the target increase correction amount that is derived based on the input data is Q, the increase correction amount to be derived (the increase correction amount used in the instruction given to the adjusting device) is $Q_n$, the present increase correction amount is $Q_{n-1}$, and a predetermined value for performing stepwise correction is q, the increase correction amount to be derived $Q_n$ is obtained according to the equation 1, $Q_n = Q_{n-1} + q (Q_n \leq Q)$.

When the target increase correction amount is derived, the increase correction amount may be repeatedly calculated according to the equation 1 until the increase correction amount $Q_n$ becomes equal to the target increase correction amount Q, and instruction for performing the increase correction of the intake air amount may be issued each time $Q_n$ is calculated until the increase correction amount $Q_n$ becomes equal to the target increase correction amount Q. Alternatively, the increase correction amount may be calculated according to the equation 1 only once when the target increase correction amount Q is derived once, one increase correction amount may be derived when the routine processing shown in FIG. 3 is performed once, and the instruction may be issued such that the increase correction of the intake air amount is performed based on the derived increase correction amount.

As described above, the ECU 50 derives, using different processes, the increase correction amount of the intake air amount in the case where the vehicle speed is 0 and the increase correction amount in the case where the vehicle speed is not 0 when the secondary air is supplied.

The ECU 50 controls the idle speed such that the intake air amount is increased by the derived increase correction amount. More specifically, the ECU 50 instructions the ISCV 26 to enlarge the area flow area in the bypass passage so as to perform the increase correction of the intake air amount.

Description will be made of the variation of the state at each of the portions concerning the engine, and the like in the case where the increase correction of the intake air amount is performed as described above, with reference to the timing chart in FIG. 4.

In FIG. 4, the period T1 is a first idling period in which the operation of supplying the secondary air is performed, and the vehicle speed is 0. Accordingly, the increase correction amount is derived by the first process (i.e., the increase correction amount for the intake air amount correction A shown in FIG. 3 is derived) in the period T1.

Accordingly, as shown in FIG. 4, ISC correction, i.e., correction by ISC is performed in the period T1. In other words, air is delivered into the combustion chambers such that the intake air amount is increased by the increase correction amount shown by an arrow X in FIG. 4.

As a result, the engine speed increases. In other words, the engine speed increases by an amount shown by an arrow x1 from a dotted line p1 to a solid line in FIG. 4. Also, since the exhaust gas amount increases due to the increase in the engine speed, the rate of increase in the catalyst bed temperature increases. In other words, the rate of increase in the catalyst bed temperature increases by an amount shown by an arrow x2 from a dotted line q1 to a solid line in FIG. 4.

Also, in the period T3 in FIG. 4, the vehicle is decelerated, the operation of supplying the secondary air is performed, and the vehicle speed is not 0. Accordingly, the increase correction amount is derived using the second process (i.e., the increase correction amount for the intake air amount correction B shown in FIG. 3 is derived).

Accordingly, as shown in FIG. 4, the ISC correction is performed in the period T3. In other words, air is delivered into the combustion chambers such that the intake air amount is increased by the increase correction amount shown by an arrow Y in FIG. 4.

As a result, the engine speed increases. In other words, the engine speed increases by an amount shown by an arrow y1 from a dotted line q2 to a solid line in FIG. 4. Also, since the exhaust gas amount increases due to the increase in the engine speed, the rate of increase in the catalyst bed temperature increases. In other words, the rate of increase in the bed temperature of the catalyst increases by an amount shown by an arrow y2 from a dotted line q2 to a solid line in FIG. 4. The dotted line q2 indicates a case where the ISC correction is performed only during idling.

As described above, when the engine speed decreases due to the operation of supplying the secondary air, the engine speed is increased by performing the increase correction of the intake air amount. Thus, in the first idling period (i.e., in the period T1 in FIG. 4), idling stability can be maintained, and the warm-up efficiency of the catalyst is improved. Also, the warm-up efficiency of the catalyst is improved in the period in which the vehicle is decelerated (i.e., in the period T3 in FIG. 4).

The apparatus in which a delivery amount of the secondary air is constant has been described so far. However, the same configuration can be applied to an apparatus in which the delivery amount of the secondary air can be controlled so as to be variable.

In other words, whether the delivery amount of the secondary air is constant or can be controlled so as to be variable, idling stability can be maintained by performing the increase correction of the intake air amount while the secondary air is supplied.

Meanwhile, in the case where the delivery amount of the secondary air can be controlled so as to be variable, it is possible to maintain the warm-up efficiency of the catalyst by controlling the delivery amount of the secondary air.

However, as the delivery amount of the secondary air is increased in order to increase the increasing rate of the catalyst bed temperature, the load on the engine increases, and the engine speed decreases. Accordingly, in this case, the effect of increasing the increasing rate of the catalyst bed temperature can be synergistically improved by performing the increase correction of the intake air amount.

Also, in the embodiment, there has been described the internal combustion engine in which the intake air amount can be increased by the appropriate increase correction amount in both the case where the vehicle speed is 0 and the case where the vehicle speed is not 0.

However, in some internal combustion engines, sufficient idling stability is maintained without performing increase correction of the intake air amount when the vehicle speed is 0, that is, during first idling. Alternatively, in some internal combustion engines, stable warm-up efficiency of the catalyst is maintained without performing the increase correction of the intake air amount when the vehicle speed is not 0.

In these internal combustion engines, the increase correction of the intake air amount may be performed only when the secondary air is supplied and the vehicle speed is not 0. Alternatively, the increase correction of the intake air amount may be performed only when the secondary air is supplied and the vehicle speed is 0.

[Second Embodiment]

Figure 5:
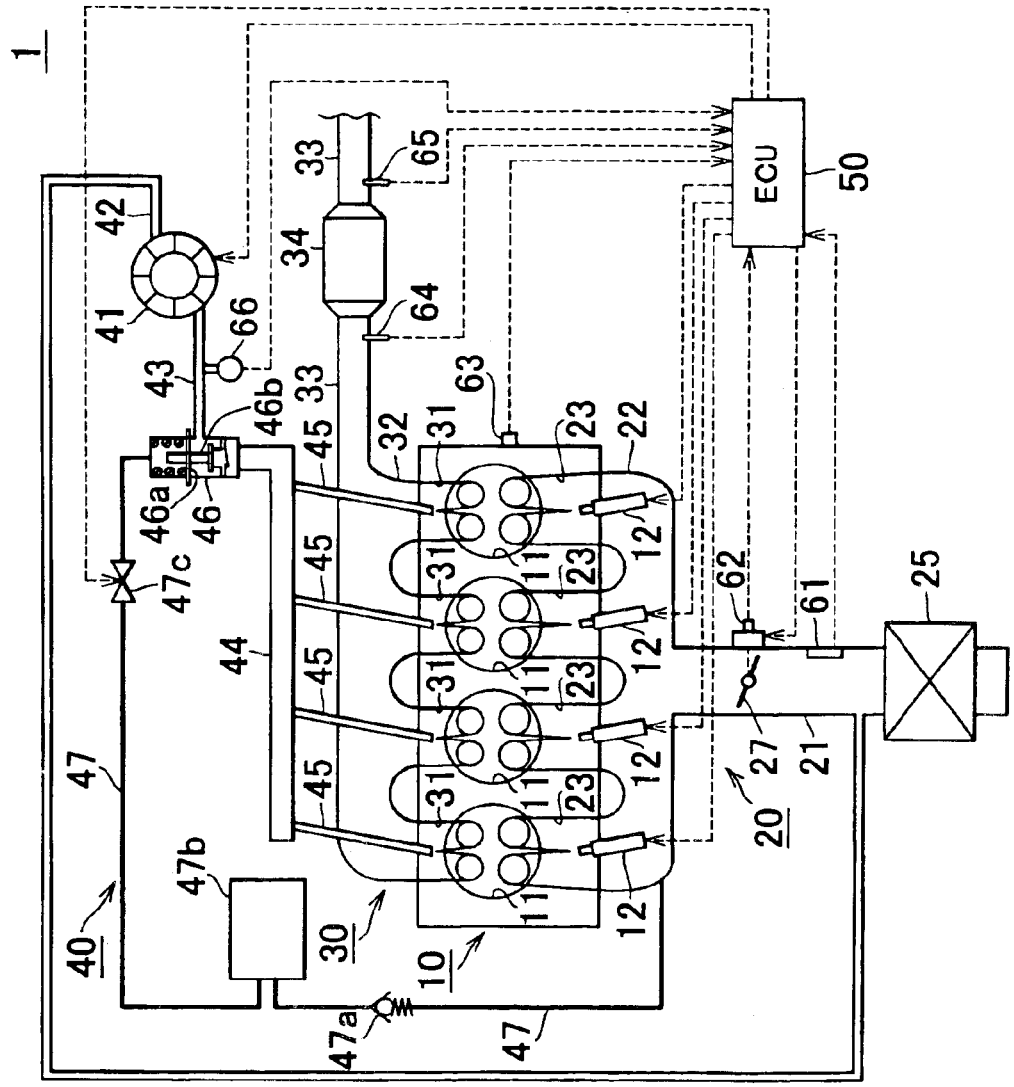
FIG. 5 is a block diagram showing a basic configuration of an internal combustion engine according to a second embodiment of the invention.

FIG. 5 shows a basic configuration of an internal combustion engine according to a second embodiment of the invention. In the first embodiment, the idle speed control (ISC) is employed as the adjusting device which adjusts the intake air amount delivered into the combustion chambers from the intake pipe. In the second embodiment, the electronic control throttle system is employed as the adjusting device.

Since the other configurations and effects are the same as in the first embodiment, the same components are denoted by the same reference numerals, and the description thereof will be omitted.

In the second embodiment, a throttle valve 27 provided in the intake pipe 21 is an electronic controlled butterfly valve whose opening is changed according to a command signal from the ECU 50 and which adjusts the area of the flow passage for the intake air (i.e., adjusts the flow amount).

The opening of the throttle valve 27 is decided based on the depression amount of the accelerator pedal (not shown) and various parameters reflecting the operating state of the engine 1.

In the second embodiment, the ECU 50 derives an increase correction amount using the first process or the second process in the same manner as in the first embodiment. The ECU 50 performs control such that the intake air amount is increased by the derived increase correction amount. More specifically, in the second embodiment, the ECU 50 decides the opening of the throttle valve 27 such that the intake air amount is increased by the derived increase correction amount.

As described so far, in the case where the intake air amount is adjusted by the electronic controlled throttle system, the same effects as in the first embodiment can be obtained.

While the invention has been described with reference to preferred embodiments thereof, it is to be understood that the invention is not limited to the preferred embodiments or constructions. To the contrary, the invention is intended to cover various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. An internal combustion engine comprising:
   an air pump that supplies secondary air to an upstream side of an exhaust gas control catalyst in an exhaust pipe via a secondary air supply passage;
   an adjusting device that adjusts an intake air amount delivered into a combustion chamber from an intake pipe; and
   a controller that performs control for increase correction of the intake air amount adjusted by the adjusting device during substantially an entire time period during which the air pump performs an operation of supplying the secondary air.

2. The internal combustion engine according to claim 1, wherein
   the controller performs control for the increase correction of the intake air amount adjusted by the adjusting device during substantially the entire time period during which the air pump performs the operation of supplying the secondary air during idling immediately after the internal combustion engine is started.

3. The internal combustion engine according to claim 1, wherein the controller performs control for the increase correction of the intake air amount adjusted by the adjusting device during substantially the entire time period during which the air pump performs the operation of supplying the secondary air while the internal combustion engine is warmed-up.

4. An internal combustion engine for a vehicle, comprising:
   an air pump that supplies secondary air to an upstream side of an exhaust gas control catalyst in an exhaust pipe via a secondary air supply passage;
   an adjusting device that adjusts an intake air amount delivered into a combustion chamber from an intake pipe;
   a vehicle speed detector which detects a vehicle speed; and
   a controller that performs control for increase correction of the intake air amount adjusted by the adjusting device during substantially an entire time period during which the air pump performs an operation of supplying the secondary air, and that derives an increase correction amount for the increase correction in a case where the vehicle speed detected by the vehicle speed detector is 0 using a first process, and derives an increase correction amount for the increase correction in a case where the vehicle speed detected by the vehicle speed detector is not 0 using a second process that is different from the first process.

5. The internal combustion engine for a vehicle according to claim 4, wherein the controller makes setting such that the increase correction amount derived using a process which is used in a case where the vehicle speed is not 0 becomes larger than the increase correction amount derived using a process which is used in a case where the vehicle speed is 0 when the same data is input to each of the processes.

6. A control apparatus for an internal combustion engine for a vehicle, comprising:
   an adjusting device that adjusts an intake air amount delivered into a combustion chamber from an intake pipe;
   a recognizing device that recognizes whether or not secondary air is to be supplied;
   a vehicle speed detector that detects a vehicle speed; and
   a controller that derives an increase correction amount for increasing the intake air amount delivered into the combustion chamber from the intake pipe using a first process when the recognizing device recognizes that the secondary air is to be supplied and the vehicle speed detector detects that the vehicle speed is 0, and derives an increase correction amount for increasing the intake air amount using a second process which is different from the first process when the recognizing device recognizes that the secondary air is to be supplied and the vehicle speed detector detects that the vehicle speed is not 0, and that gives instruction to the adjusting device such that the intake air amount is increased by the derived increase correction amount during substantially an entire time period during which the secondary air is supplied.

7. The control apparatus for an internal combustion engine for a vehicle according to claim 6, wherein the controller makes setting such that the increase correction amount derived using a process which is used in a case where the vehicle speed is not 0 becomes larger than the increase correction amount derived using a process which is used in a case where the vehicle speed is 0 when the same data is input to each of the processes.

8. A control method for an internal combustion engine which includes an air pump that supplies secondary air to an upstream side of an exhaust gas control catalyst in an exhaust pipe via a secondary air supply passage, and an adjusting device that adjusts an intake air amount delivered into a combustion chamber from an intake pipe, comprising the step of:

performing increase correction of the intake air amount adjusted by the adjusting device during substantially an entire time period during which the air pump performs an operation of supplying the secondary air.

9. The control method according to claim 8, wherein control for the increase correction of the intake air amount adjusted by the adjusting device is performed during substantially the entire time period during which the air pump performs the operation of supplying the secondary air during idling immediately after the internal combustion engine is started.

10. The control method according to claim 8, wherein control for the increase correction of the intake air amount adjusted by the adjusting device is performed during substantially the entire time period during which the air pump performs the operation of supplying the secondary air while the internal combustion engine is warmed-up.

11. A control method for an internal combustion engine for a vehicle, comprising the steps of:

deriving an increase correction amount for increasing an intake air amount in a case where a vehicle speed is 0 using a first process, and deriving an increase correction amount for increasing the intake air amount in a case where the vehicle speed is not 0 using a second process that is different from the first process when secondary air is supplied; and performing control so as to deliver air into a combustion chamber such that the intake air amount is increased by the derived increase correction amount during substantially an entire time period during which the secondary air is supplied.

12. The control method according to claim 8, wherein setting is made such that a second increase correction amount derived using a second process which is used in a case where a vehicle speed is not 0 becomes larger than a first increase correction amount derived using a first process which is used in a case where the vehicle speed is 0 when the same data is input to each of the processes.

13. The internal combustion engine according to claim 1, wherein an amount of the increase correction is determined based on at least one of: (i) a coolant temperature, (ii) an intake air amount prior to the increase correction, and (iii) a difference between a target engine speed and an actual engine speed.

14. The internal combustion engine according to claim 4, wherein an amount of the increase correction is determined based on at least one of: (i) a coolant temperature, (ii) an intake air amount prior to the increase correction, and (iii) a difference between a target engine speed and an actual engine speed.

15. The control apparatus according to claim 6, wherein the increase correction amount is determined based on at least one of: (i) a coolant temperature, (ii) an intake air amount prior to the increase correction, and (iii) a difference between a target engine speed and an actual engine speed.

16. The control method according to claim 8, wherein an amount of the increase correction is determined based on at least one of: (i) a coolant temperature, (ii) an intake air amount prior to the increase correction, and (iii) a difference between a target engine speed and an actual engine speed.

17. The control method according to claim 11, wherein the increase correction amount is determined based on at least one of: (i) a coolant temperature, (ii) an intake air amount prior to the increase correction, and (iii) a difference between a target engine speed and an actual engine speed.

\* \* \* \* \*